G. D. KRUMLAW.
INSECT DESTROYER.
APPLICATION FILED MAY 21, 1917.
1,299,580.
Patented Apr. 8, 1919.
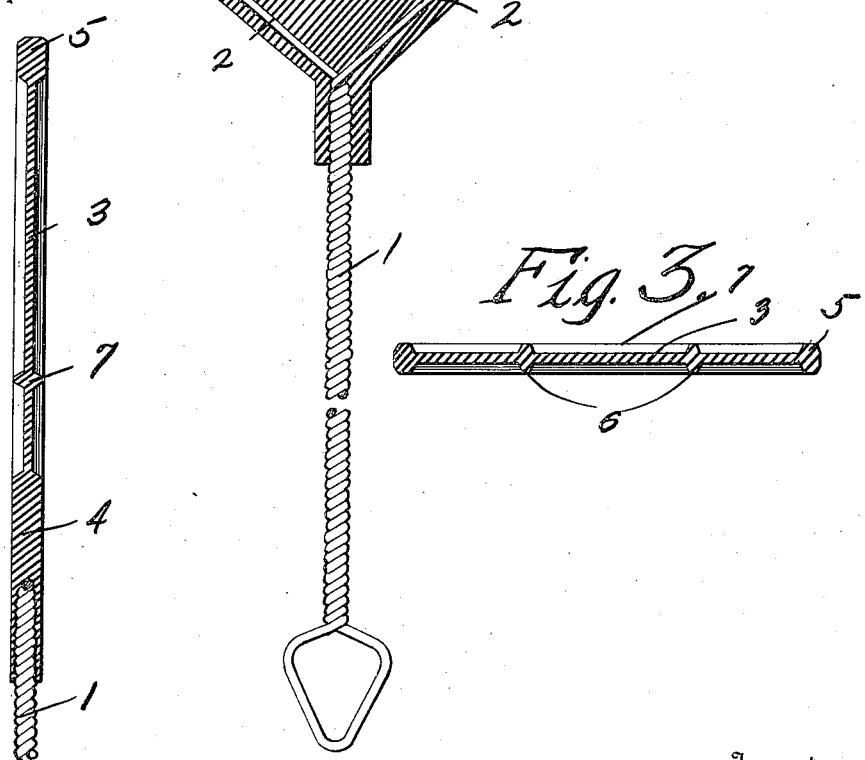
Inventor
G. D. Krumlaw,

UNITED STATES PATENT OFFICE.

GEORGE D. KRUMLAW, OF ASHLAND, OHIO.

INSECT-DESTROYER.

1,299,580.	Specification of Letters Patent.	Patented Apr. 8, 1919.

Application filed May 21, 1917. Serial No. 170,038.

*To all whom it may concern:*

Be it known that I, GEORGE D. KRUMLAW, a citizen of the United States, residing at Ashland, in the county of Ashland, State of Ohio, have invented certain new and useful Improvements in Insect-Destroyers, and I do hereby declare the following to be a full, clear, and exact description of the invention, such as will enable others skilled in the art to which it appertains to make and use the same.

This invention relates to insect destroying devices, and has particular reference to implements of the character known as fly swatters.

The object of the invention is to provide a swatter which will be effective in killing off flies without the danger of marring the surface or finish of furniture, a disadvantage which is unavoidable in the use of the swatters which are formed of wire fabric. As a further advantage which I secure by my present invention, I call attention to the fact that the new structure is easily cleansed by washing, since it is formed of a continuous web of rubber interrupted only by ridges, and by perforations which may become unsanitarily soiled with the bodies of dead flies.

With the above object in view, and such others relating to the details of construction, as may hereinafter appear, my invention will now be fully set forth and described, reference being had to the accompanying drawings.

In the drawings:—

Figure 1 is a plan view,

Fig. 2 is a vertical section, and

Fig. 3 is a section on line 3—3 of Fig. 1.

Referring more particularly to the drawings, 1 represents a handle which is preferably formed of twisted wire whose ends 2 are spread into a divergent fork. Cured upon the ends 2 and a certain portion of the shank of the handle 1 is the rubber body 3. The body 3 is a comparatively thin web of generally rectangular character which, around the handle 1 and the ends 2 is thickened into a Y-shaped supporting portion 4. Extending around the edge of the web 3 is a reinforcing rib 5, which is transversely and longitudinally connected by means of the ribs 6 and 7. The body is formed identically on both sides, and the dished surfaces formed by the ribs which outline the body and also traverse it, make it possible to kill the flies without unduly crushing the bodies.

The fact that the supporting portion is heavily molded around the forked ends of the handle provides that the body of the swatter will not be thrown off of the handle by the force of the blows, and furthermore this so joins the body to the handle that there is no danger of the body becoming weakened at the neck or at the junction of the ends 2 of the handle as is so common with many swatters, so that the body finally breaks at that point.

It will be noted that by reason of the fact that the head of the article is formed of rubber, the thin body or panel portions 3, will when the ribs or thickened portions strike a surface, continue to move to strike the surface and a fly that may be thereon. Thus, the thickened portions serve to suddenly arrest the movement of the destroyer or swatter at its thickened portions so that its thin portions will contribute a sharp blow.

What I claim as my invention is:—

1. An insect destroyer, consisting of a rubber body and a handle having a forked end about which the rubber of the body is molded and cured, said body including a thickened support having said forked ends therein and extending to the marginal portions of the latter as a reinforcement, and a flexible portion extending from the support and including a thin flexible web which is held in flat relation by the reinforcement in the support and a plurality of longitudinal reinforcing ribs traversing the web.

2. An insect destroyer, consisting of a rubber body and a handle having a forked end about which the rubber of the body is molded and cured, said body including a thickened support having said forked ends molded therein and extending to the marginal portions of the latter as a reinforcement and a flexible portion extending from the support and including a thin flexible web which is held in flat relation by the reinforcement in the support, and a plurality of reinforcing ribs traversing the web in coincident relation on opposite sides thereof and subdividing the web into comparatively wide flexing sections.

In testimony whereof, I affix my signature in the presence of two witnesses.

GEORGE D. KRUMLAW.

Witnesses:
P. E. HOLBEN,
HARRY G. COLE.